(12) United States Patent
Pan et al.

(10) Patent No.: US 6,862,277 B2
(45) Date of Patent: Mar. 1, 2005

(54) METHOD AND APPARATUS FOR MULTI-MEDIA COMMUNICATION OVER MULTIPLE NETWORKS

(75) Inventors: Shaowei Pan, Kildeer, IL (US); Fei Wu, Hoffman Estates, IL (US); Nicholas Labun, Chicago, IL (US); Anthony Kobrinetz, Hoffman Estates, IL (US); Angel Fernando Favila, Lake in the Hills, IL (US)

(73) Assignee: Motorola, Inc., Schaumburg, IL (US)

(*) Notice: Subject to any disclaimer, the term of this patent is extended or adjusted under 35 U.S.C. 154(b) by 7 days.

(21) Appl. No.: 10/281,842

(22) Filed: Oct. 28, 2002

(65) Prior Publication Data

US 2004/0081159 A1 Apr. 29, 2004

(51) Int. Cl.[7] .............................................. H04L 12/28
(52) U.S. Cl. ....................... 370/352; 370/401; 370/410; 370/522
(58) Field of Search ................................. 370/352, 401, 370/410, 522, 466

(56) References Cited

U.S. PATENT DOCUMENTS

| | | | |
|---|---|---|---|
| 5,428,608 A | * | 6/1995 | Freeman et al. ............ 370/261 |
| 6,392,999 B1 | * | 5/2002 | Liu et al. .................... 370/260 |
| 6,438,114 B1 | * | 8/2002 | Womack et al. ............. 370/329 |
| 6,584,490 B1 | * | 6/2003 | Schuster et al. ............ 709/200 |
| 6,601,099 B1 | * | 7/2003 | Corneliussen ............... 709/224 |
| 6,625,141 B1 | * | 9/2003 | Glitho et al. ................ 370/352 |
| 6,768,726 B2 | * | 7/2004 | Dorenbosch et al. ....... 370/331 |
| 6,775,277 B1 | * | 8/2004 | Li et al. ...................... 370/389 |

* cited by examiner

Primary Examiner—Chau Nguyen
Assistant Examiner—Nittaya Juntima
(74) Attorney, Agent, or Firm—Vedder, Price, Kaufman & Kammholz, P.C.

(57) ABSTRACT

A method and apparatus for multi-media communication includes transmitting a first session invite request (300) having a plurality of first call transaction identifiers (302), wherein each of the first call transaction identifiers (302) has a first call transaction value (303). Thereupon, the method and apparatus engages in a first communication session using the first session invite request (300). Concurrently, a second session invite request (400), having a plurality of second call transaction identifiers (402) having a second call transaction value (403), is also transmitted. A determination is made if the second session invite request (400) is duplicative by comparing the first and second call transaction values (303, 403) of the first and second call transaction identifiers (302, 402). A second communication session is engaged if the second session invite request (400) is not duplicative such that the first communication session and the second communication session create a multi-media session.

25 Claims, 6 Drawing Sheets

|     | SIP INVITE REQUEST |     |
| --- | --- | --- |
| 104 — INVITE SIP | USER B | 105 |
| 106 — VIA | NETWORK | 107 |
| 108 — FROM | USER A | 109 |
| 110 — TO | USER B | 111 |
| 112 — CALLID | 1234567 | 113 |
| 114 — CSEQ | 1 INVITE | 115 |
| 116 { M | AUDIO 1111 RTP/AVP | 117 |
| M | VIDEO 2222 RTP/AVP | 118 |

Figures 3, 4:
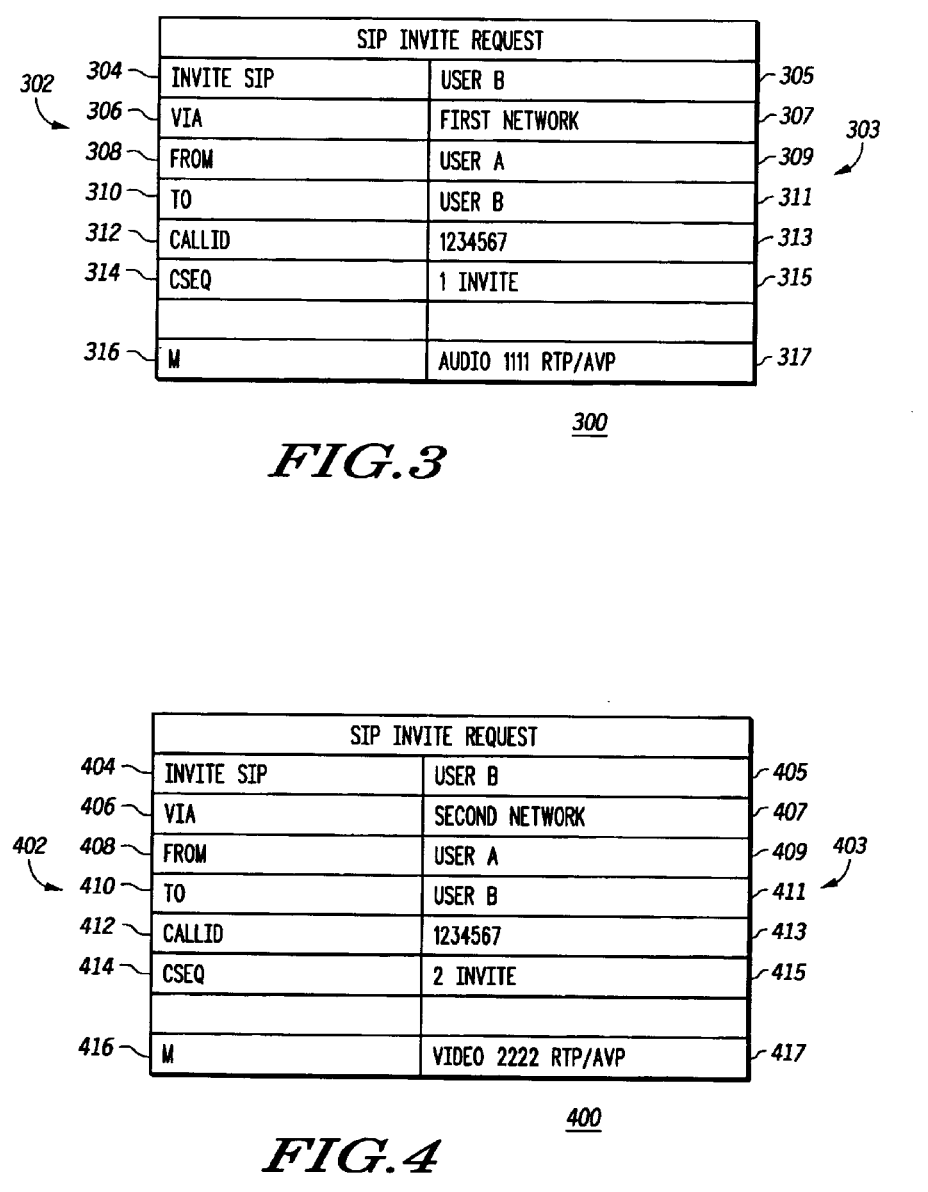

|     | SIP INVITE REQUEST |     |
| --- | --- | --- |
| 304 — INVITE SIP | USER B | — 305 |
| 306 — VIA | FIRST NETWORK | — 307 |
| 308 — FROM | USER A | — 309 |
| 310 — TO | USER B | — 311 |
| 312 — CALLID | 1234567 | — 313 |
| 314 — CSEQ | 1 INVITE | — 315 |
|  |  |  |
| 316 — M | AUDIO 1111 RTP/AVP | — 317 |

*FIG. 3*  300

|     | SIP INVITE REQUEST |     |
| --- | --- | --- |
| 404 — INVITE SIP | USER B | — 405 |
| 406 — VIA | SECOND NETWORK | — 407 |
| 408 — FROM | USER A | — 409 |
| 410 — TO | USER B | — 411 |
| 412 — CALLID | 1234567 | — 413 |
| 414 — CSEQ | 2 INVITE | — 415 |
|  |  |  |
| 416 — M | VIDEO 2222 RTP/AVP | — 417 |

*FIG. 4*  400

METHOD AND APPARATUS FOR MULTI-MEDIA COMMUNICATION OVER MULTIPLE NETWORKS

BACKGROUND OF THE INVENTION

The present invention relates generally to multi-media communication, and more specifically to the multi-media communication with multiple communication sessions through multiple networks, wherein a network includes an individual or combination of communication paths, such as, but not limited to, an internet, an intranet, a local area network, a wireless local area network, a wireless wide area network, a cellular network, or any other suitable communication path capable of facilitating communication.

In a typical communication system, a first communication device interacts with a second communication device through at least one network, wherein a communication device includes, but not limited to, a terminal computer, a mobile computing device, a personal digital assistant, a mobile telephone, or any other suitable device capable of engaging in communication. In order to properly facilitate the communication process, the first communication device initiates the communication by transmitting a session invite request, such as a session initiation protocol (SIP) invite request, to the second communication device. The session invite request is provided to a session proxy in communication with the at least one communication network, wherein the session proxy includes any device, implemented in hardware, software, or a combination thereof for transfer of information between multiple communication devices and/or networks. The session proxy provides the session invite request to the second communication device, such that the second communication device can accept the session invite request and transmit an acknowledgment signal (ACK) back to the first communication device. A communication session is then active between the first and second communication devices, wherein a communication session includes, but not limited to, an active communication connection between multiple communication devices where information is transferred therebetween. Moreover, a multi-media communication session includes the combination of multiple active communication sessions directed to different media types.

FIG. 1 illustrates a prior art session invite request 100, such as a SIP invite request, includes a plurality of call transaction identifiers 102 indicating communication information used for the establishment of a communication session, wherein each of the plurality of call transaction identifiers 102 has a call transaction value 103. For example, a SIP call transaction identifier, INVITE SIP 104 contains a field "USER B" 105, wherein the INVITE SIP 104 indicates that the invite request is to be transmitted to USER B. Another example of a call transaction identifier is a VIA identifier 106, which designates how the communication between the initiating communication device is provided to USER B, through NETWORK 107. The SIP invite request also includes a FROM field 108, USER A 109, and a TO field 110, USER B 111.

The SIP invite request 100 further contains a CALL ID field 112, "1234567" 113 and a command sequence (Cseq) field 114, 1 INVITE 115. The prior art SIP invite request 100 further contains at least one media field 116 which indicates the type of media to be communicated within the communication session, such as AUDIO 117 and VIDEO 118. In the prior art session invite request 100, a plurality of media indicators 116 are provided, indicating an audio field and a video field for multi-media communication.

If a prior art communication device attempts to engage in a multi-media communication session, wherein the multi-media communication includes multiple communication sessions wherein the different communication devices share information having more than one media type, such as, but not limited, audio, text, or video, across one or more networks, the communication device will send the session invite request 100, typically to the proxy or directly to the second communication device. If the prior art communication device attempts to engage in a multi-media communication session across multiple networks, for example utilizing a first network for a first media type and a second network for a second media type, the device will resend the same session invite request 100 multiple times, wherein the receiving device, such as the proxy or second communication device, ignores the multiple requests as being deemed duplicative of the original request. Therefore, a communication device cannot engage in a multi-media session over multiple networks, as the proxy or second communication device cannot distinguish between multiple session invite requests from the first communication device to the second communication device.

BRIEF DESCRIPTION OF THE DRAWINGS

The invention will be more readily understood with reference to the following drawings wherein:

FIG. 3 illustrates a first session invite request, in accordance with one embodiment of the present invention;

FIG. 4 illustrates a second session invite requests in accordance with one embodiment of the present invention;

DETAILED DESCRIPTION OF A PREFERRED EMBODIMENT OF THE INVENTION

Briefly, a method and apparatus for multi-media communication includes transmitting a first session invite request having a plurality of first call transaction identifiers, wherein each of the first call transaction identifiers has a first call transaction value. Thereupon, the method and apparatus engages in a first communication session using the first session invite request. Concurrently, a second session invite request, having a plurality of second call transaction identifiers having a second call transaction value, is also transmitted. A determination is made if the second session invite request is duplicative by comparing the first and second call transaction values of the first and second call transaction identifiers. A second communication session is engaged if the second session invite request is not duplicative, wherein the first session invite request designates a first media type for the first communication session and the second session invite request designates a second media type for the second communication session. As such, the first communication session and the second communication session create a multi-media session.

Figures 1, 2:
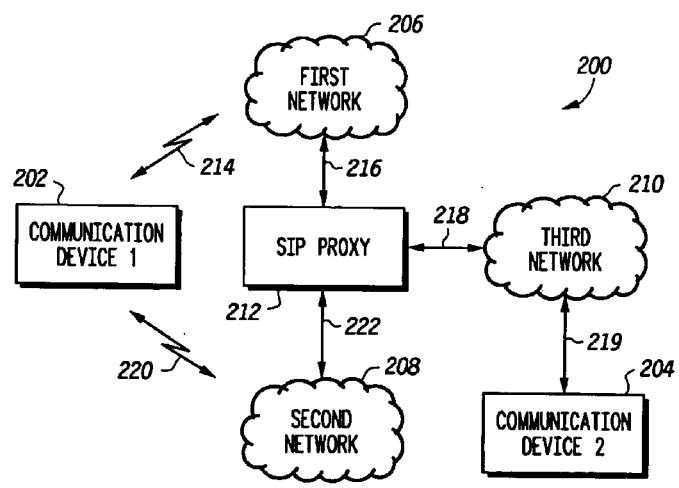
FIG. 1 illustrates a prior art session invite request.
FIG. 2 illustrates a block diagram of a multi-media communication system, in accordance with one embodiment of the present invention.

FIG. 2 illustrates a multi-media communication system 200 between a first communication device 202 and a second communication device 204. The communication system 200 further includes a first network 206, a second network 208 and a third network 210, wherein the networks 206, 208 and 210 may be a wireless wide area network, an internet, an enterprise network, a local area network, a cellular network, an access network, or any other suitable network such as a wireless or wired network as recognized by one having ordinary skill in the art. The communication system 200 also includes a proxy 212, such as a SIP proxy, in communication with the networks 206, 208 and 210.

In initiating a multi-media communication session, wherein the multi-media communication session is the combination of a first communication session and a second communication session, the communication device 202 sends a first session invite request, such as an SIP invite request, (300, as discussed below with reference to FIG. 3) intended for the second communication device 204 through the first network 206 via communication path 214, such as a wired or wireless communication path.

In accordance with known communication techniques, the first network 206 provides the first SIP invite request to the SIP proxy 212, via communication path 216, which may be a wired or wireless transmission path. The SIP proxy 212 receives the first SIP invite request 300 and forwards the invite request 300 to the second communication device 204 through the third network 210, via communication paths 218 and 219. Thereupon, the second communication device 204 may receive and acknowledge the SIP invite request 300 and transmit an acknowledgment signal (ACK) back to the first communication device 202 via the SIP proxy 212 so as to engage in the first communication session.

In one embodiment, the first communication session is directed to a first media, such as, but not limited to, text or voice data. Therefore, to engage in a multi-media communication session, the first communication device 202 sends a second session invite request, such as a second SIP invite request, 400 (as discussed below with reference to FIG. 4), to the second network 208 via communication path 220, which may be a wired or wireless communication path. The second SIP invite request 400 is provided to the SIP proxy 212, via a communication path 222, wherein the SIP proxy 212 makes a determination whether the second SIP invite request 400 is a new SIP invite request or a duplicate of first SIP invite request 300. If the SIP proxy 212 determines the second SIP invite request 400 is not a duplicate, the SIP proxy 212 provides the second SIP invite request 400 to the second communication device 204, wherein the second communication device 204 may receive and acknowledge the second SIP invite request 400 and thereupon acknowledge and engage the second communication session via the SIP proxy 212. As discussed above with reference to the first communication session, the second communication session may also be directed to at least one media type, such as, but not limited to, video.

Each SIP invite request, 300 and 400, contains a plurality of SIP call transaction identifiers 302, 402, wherein each SIP call transaction identifier has a call transaction value 303, 403. FIG. 3 illustrates the first SIP call transaction identifiers 302 and call transaction values 303, individually designated from 304 through 317. FIG. 4 illustrates the second SIP invite request 400 having the plurality of second SIP call transaction identifiers 402 and second call transaction values 403, individually designated from 404–417. As discussed above, the SIP invite request 300 and 400 contain the request information to initiate communication sessions between a first and second communication device.

FIGS. 3 and 4 further illustrate that each of the plurality of first SIP call transaction identifiers has a corresponding second SIP call transaction identifier 402. Several of the first SIP call transaction identifiers 302 and the second SIP call transaction identifiers 402 are the same, for example the invite SIP fields, 304 and 404 both contain the call transaction value USER B, 305 and 405, the FROM and TO fields, 308, 408, 310 and 410 contain the call transaction values USER A and USER B, 309, 409, 311 and 411, and the call ID fields 312, 412 also contain the call transaction value 1234567, 313 and 413. Also, several of the call transaction identifiers 302 and 402 are also different, such as the VIA fields 306, 406 which contain the call transaction values first network 307 and second network 407, the CSEQEQ fields 314, 414 contain the call transaction values one INVITE 315, two INVITE 415, and the media fields 316, 416 contain the call transaction values AUDIO 1111 RTP/AVP 317 and VIDEO 2222 RTP/AVP 417.

As recognized by one having ordinary skill in the art, the first SIP call transaction identifiers 304–316 and the second SIP call transaction identifiers 404–416 are for illustration purposes only, wherein other SIP call transaction identifiers may be included within the SIP invite request 300, 400. Whereas, the first SIP invite request 300 and the second SIP invite request 400 is generated by the first communication device 202, therefore any additional call transaction identifiers will be correspondingly designated within all SIP invite requests, such as 300 and 400. Furthermore, the SIP call transaction identifiers 302 and 402 are not an exhaustive list of identifiers, but rather are for illustration purposes only and not meant to be so designated as limiting herein.

Figure 5:
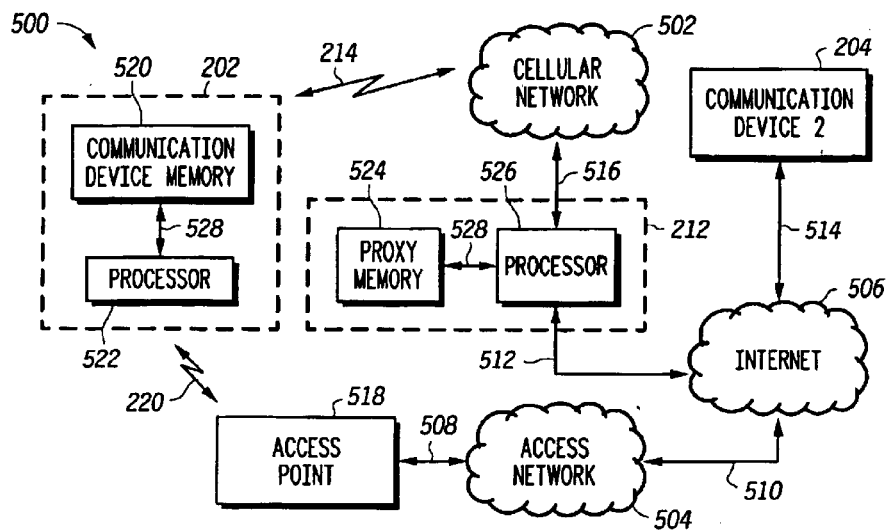
FIG. 5 illustrates a block diagram of the multi-media communication system of FIG. 2.

FIG. 5 illustrates another embodiment of the apparatus for multi-media communication. The communication system 500 includes the first communication device 202 and the second communication device 204. The system further includes the SIP proxy 212 and a plurality of networks, specifically a cellular network 502, an access network 504, and an internet 506. The access network 504 may be any access network, such as a Bluetooth or IEEE 802.11 access network, or any suitable other access network as recognized by one having ordinary skill in the art. The system 500 further includes an access point 518 in communication with the access network 504 via communication path 508. The access network 504 is in communication with the internet 506 via communication path 510 and the internet 506 is in communication with the SIP proxy 212 via communication path 512 and in communication with the second communication device 204 via communication path 514. Moreover, the cellular network 502 is in communication with the SIP proxy 212 via communication path 516. Similar to the system 200 of FIG. 2, the first communication device 202 provides the first SIP invite request 300 to the SIP proxy 212 across the cellular network 502 via communication path 214. The first communication device 202 also provides the second SIP invite request 400 to the SIP proxy 212 via communication path 220 to an access point 518 and across the access network 504 and the internet 506 via communication path 220.

Similar to the system 200 of FIG. 2, the communication system 500 provides for a multi-media communication session through a first communication session communicating a first media between the first communication device 202 and the second communication device 204, and a second communication session communicating a second media between the first communication device 202 and the second communication device 204. The first communication device 202 provides a plurality of SIP invite requests, such as 300 and 400, corresponding to the number of different networks through which communication may be engaged or corresponding to the number of different types of media within the multi-media session. The SIP proxy 212 receives the plurality of SIP invite requests, such as 300 and 400, and determines, based on a comparison of the call transaction values, whether the SIP invite requests are duplicative or original requests to engage in another communication session across the SIP proxy 212.

Further illustrated in FIG. 5, the first communication device 202 includes a communication device memory 520 and a processor 522. The SIP proxy 212 further includes a proxy memory 524 and a processor 526. The processors 522, 526 may be, but not limited to, a single processor, a plurality of processors, a DSP, a microprocessor, ASIC, a state machine, or any other implementation capable of processing and executing software. The term processor should not be construed to refer exclusively to hardware capable of executing software, and may implicitly include DSP hardware, ROM for storing hardware, RAM, and any other volatile or non-volatile storage medium. The communication device memories 520, 524 may be, but not limited to, a single memory, a plurality of memory locations, shared memory, a CD, a DVD, a ROM, RAM, EPROM, optical storage, micro-code, or any other non-volatile storage capable of storing digital data for use by the processor 522.

In one embodiment, the communication device memory 520 provides executable instructions 528 to the processor 522, wherein the processor transmits the first SIP invite request 300 to the cellular network 502 across communication path 214. Within the first SIP invite request 300, the plurality of first SIP call transaction identifiers 302 having first call transaction values 303 are disposed therein. The processor 522, in response to the executable instructions 528 further generates and transmits the second SIP invite request 400 to the access point 518 across communication path 220, wherein the second invite request 400 includes the plurality of second SIP call transaction identifiers 402 having second call transaction values 403. The processor 522 generates the first SIP invite request 300 and second SIP invite request 400 by generating call transaction identifiers, such as 302 or 402, with similar call transaction, such as 305, 309–311 and 405, 409–411, and distinct call transaction values, such as 307, 313–317 and 407, 413–417, to designate separate communication sessions.

Once the SIP invite requests 300 and 400 have been acknowledged by the second communication device 204, the processor 522 thereupon, in response to executable instructions, conducts the first communication session across the SIP proxy 212 and conducts the second communication session across the SIP proxy 212 to create the multi-media communication session.

Within the SIP proxy 212, the proxy memory 524 provides the processor 526 executable instructions 530 that cause the processor 526 to receive the first SIP invite request 300 from the first communication device 202 and receive the second SIP invite request 400 from the first communication device 202. The processor 526, in response to the executable instructions, further compares the first call transaction values 303 to the second call transaction values 403. The processor 526 accepts the second SIP invite request 400 when at least one of the plurality of first call transaction values 303 is different from the corresponding one of the plurality of second call transaction values 303. The processor 526 rejects the second SIP invite request 400 when the plurality of the first call transaction values 303 are equal to the corresponding second call transaction values 403.

The processor 526 then initiates the first communication session between the first communication device 202 and the second communication device 204 using the first SIP invite request 300, wherein the communication session is across the cellular network 502 and the internet 506. If the second SIP invite request 400 is accepted, the processor 526 initiates the second communication session between the first communication device 202 and the second communication device 204 with the second SIP invite request 400 across the access network 504 via the access point 516 and through the internet 506 to create the multi-media communication session.

Figure 6:
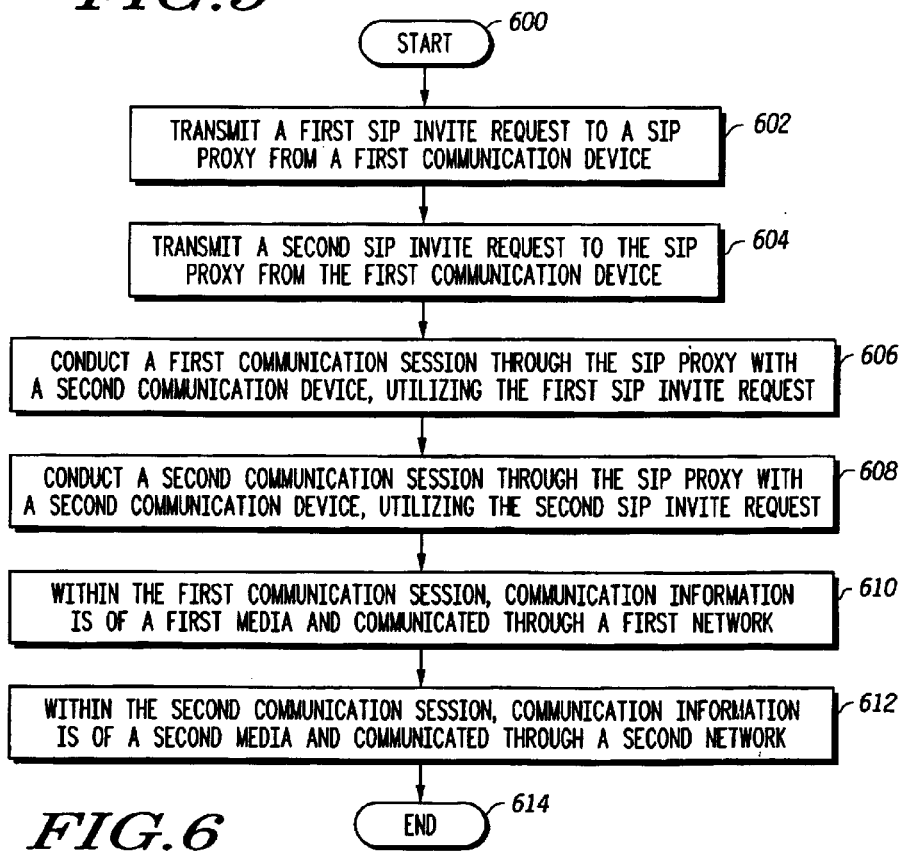
FIG. 6 illustrates a flow chart representing a method of operation of a communication device, in accordance with one embodiment of the present invention.

FIG. 6 illustrates the steps of the method of operation of a communication device, such as communication device 202, and the operation of a processor, such as processor 522 operating executable instruction 528 from the communication device memory 520, as discussed with reference to the systems of FIGS. 2 and 5. The method begins 600 when the first communication device 202 transmits the first SIP invite request 300 to the SIP proxy 212, step 602. Next the first communication device 202, transmits the second SIP invite request 400 to the SIP proxy 212, step 604. Upon acknowledgment, the first communication device 202 thereupon conducts the first communication session across the SIP proxy 212 with the second communication device 204 utilizing the first SIP invite request 300, step 606. The first communication device 202 also conducts the second communication session across the SIP proxy 212 with the second communication device 204, step 608.

Within the first communication session, communication information is of a first media, such as text or audio, and communicated across the first network 206, step 610. The media type is indicated by the media type indicator, such as 316. Within the second communication session, communication information of a second media, such as video, can be communicated across the second network 208, step 612, wherein the media type of the second session is indicated by the media type indicator, such as 416. Thus, the communication devices 202 and 204 engage in a multi-media communication session across a plurality of networks, 206, 208 and 210, step 614, wherein the multi-media communication session is the combination of the first communication session and the second communication session.

Figure 7:
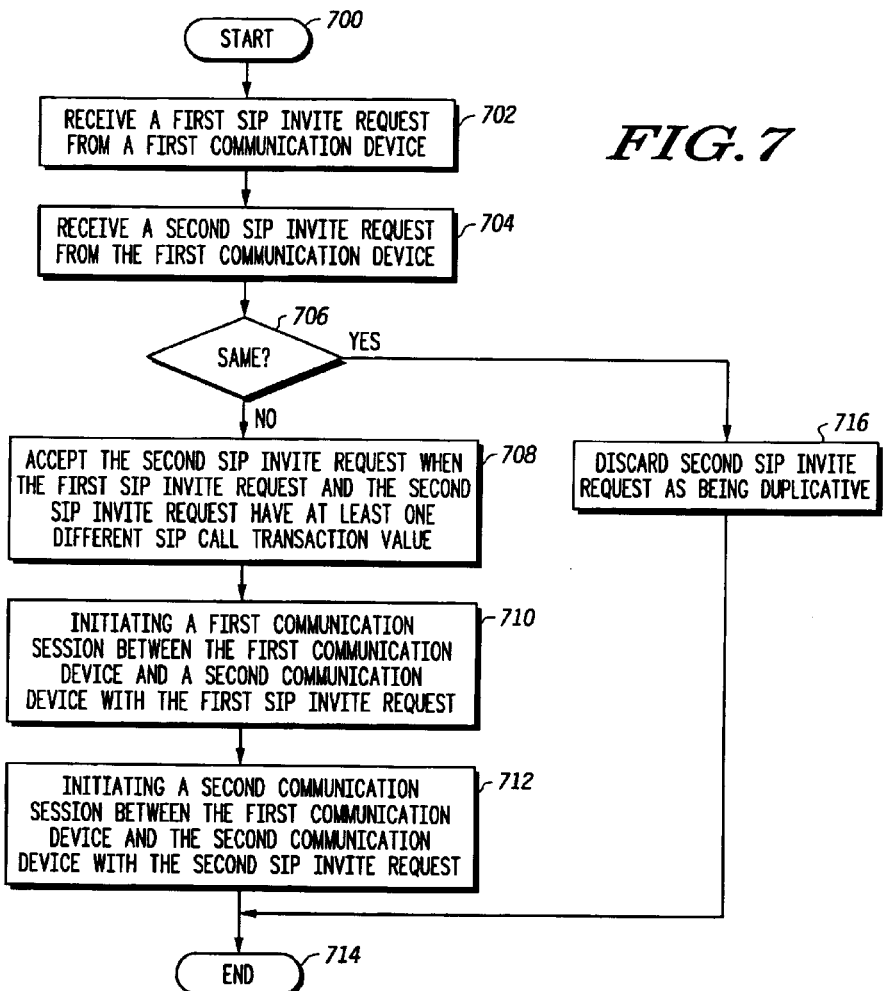
FIG. 7 illustrates a flow chart representing a method of operation of a session proxy server, in accordance with one embodiment of the present invention.

FIG. 7 illustrates the operation of the SIP proxy 212, and the operation of a processor, such as processor 526 operating executable instruction 530 from the proxy memory 524, as illustrated in FIGS. 2 and 5. The operation begins 700 when the SIP proxy 212 receives the first SIP invite request 300 from the first communication device 202 via communication path 214, step 702. Next, the SIP proxy 212 receives the second SIP invite request 400 from the first communication device 202 via communication path 220, step 704. The SIP proxy 212 determines if the plurality of first SIP call transaction identifiers 302 are the same as the corresponding plurality of second SIP call transaction identifiers 402, by comparing each specific call transaction identifier, decision block 706. If it is determined that all of the corresponding SIP call transaction identifiers 302, 402, are not equivalent, the SIP proxy 212 accepts the second SIP invite request 400, step 708.

Next, the SIP proxy 212 initiates a first communication session between the first communication device 202 and the second communication device 204 with the first SIP invite request 300, step 710, and initiates a second communication session between the first communication device 202 and the second communication device 204 with the second SIP invite request 400, step 712. As discussed above, the first communication session provides a first media, such as voice or data across the first network and provides a second media, such as video, across the second network, thereupon to provide multi-media communication across the plurality of networks, step 714. Referring back to decision block 706, if it is determined that all of the first call transaction values 303 are the same as the plurality of second call transaction values 403, the second SIP invite request 400 is discarded as it is deemed duplicative, wherein the SIP proxy 212 has already forwarded the requested communication session.

Figure 8:
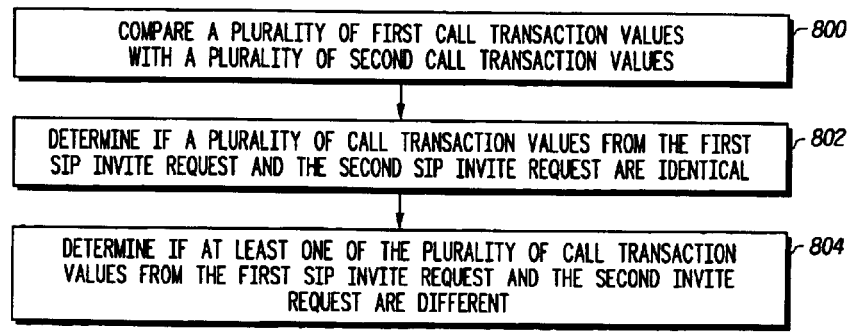
FIG. 8 illustrates one of the steps of the flow chart of FIG. 7.

Referring specifically to the decision block 706, FIG. 8 provides further illustration of the SIP proxy comparison. The SIP proxy compares a plurality of first call transaction values 303 with a plurality of second call transaction values 40, step 800. For example, referring to FIGS. 3 and 4, the INVITE SIP fields are compared, the VIA fields are compared, the FROM and TO fields are compared, the CALL ID fields are compared, and the CSeq fields and the media fields are compared.

Referring back to FIG. 1, in the prior art, to engage in a multi-media session across more than one network, the communication device would send the SIP invite request 100 at least once across each separate network. Therefore, with respect to FIG. 8 and step 802, the SIP proxy determines if the plurality of SIP call transaction identifiers 102 from the first SIP invite request 100 and the second SIP invite request 100 are identical, which would indicate that the proxy has received the same SIP invite request 100, or even sending SIP invite request 300 or 400 twice across two separate networks. The final step of the SIP proxy 212 is determining if at least one of the plurality of call transaction values 303 and 403 from the first SIP invite request 300 and the second SIP invite request 400 are different, step 804. As shown in the first SIP invite request 300 and the second SIP invite request 400, the call transaction values per the command sequence fields 314, 414 are different, the VIA fields 306, 406 are different, and the media fields 316, 416 are also different.

Figure 9:
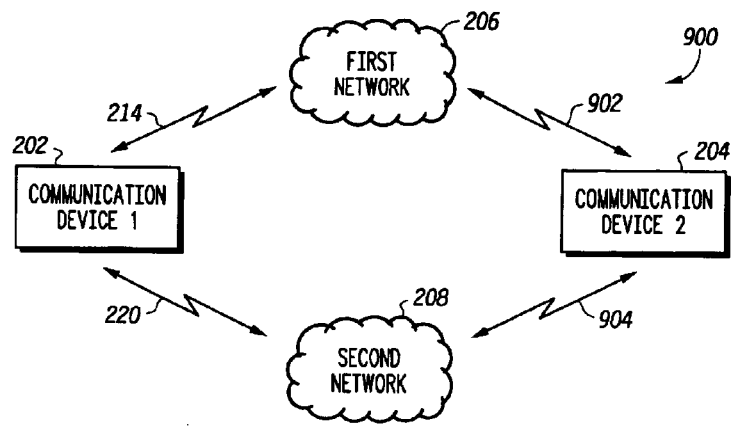
FIG. 9 illustrates a block diagram of a multi-media communication system, in accordance with another embodiment of the present invention.

FIG. 9 illustrates another embodiment of an apparatus for multi-media communication over multiple networks. Similar to the previously described embodiment, this embodiment includes the first communication device 202 and the second communication device 204 which may communicate across the first network 206 and the second network 208. As recognized by one having ordinary skill in the art, within the system 900 of FIG. 9, the first and second networks, 206 and 208 respectively, may be any type of network or may represent a plurality of networks but are illustrated herein and represent a communication path between the first communication device 202 and the second communication device 204.

Similar to the above described embodiment, the first communication device 202 provides the first SIP invite request 300 to the second communication device 204 via communication path 214 to the first network 206 and then from the first network 206 to the second communication device 204, via communication path 902. As recognized by one having ordinary skill in the art, communication path 902 may be a wire or wireless communication path. Furthermore, the first communication device 202 also provides the second SIP invite request 400 to the second communication device 204 via the second network, providing the second SIP invite request 400 to the second network 208 via communication path 220 and thereupon provided from the second network 208 to the second communication device 204 via communication path 904. As recognized by having ordinary skill in the art, communication path 904 may be a wired or wireless communication path.

Similar to the discussion relating to the SIP proxy with regards to FIGS. 2 and 5, the second communication device 204 receives both SIP invite requests and thereupon makes a determination as to whether the SIP invite request, such as 400, is duplicative of nature, or is second SIP invite request 400. If the second communication device 204 determines the second SIP invite request to contain several different call transaction values 403, with respect to the first call transaction values 303, an acknowledgment signal is sent back to the first communication device via the second network 208 across the communication paths 904 and 220. As recognized by one having ordinary skill in the art, the second communication device 204 upon receiving the first SIP invite request 300, as this SIP invite request is the first request and cannot be duplicative, the second communication device 204 has already sent an acknowledgment signal back to the first communication device 202 via the first network 206, across communication paths 902 and 214.

Figure 10:
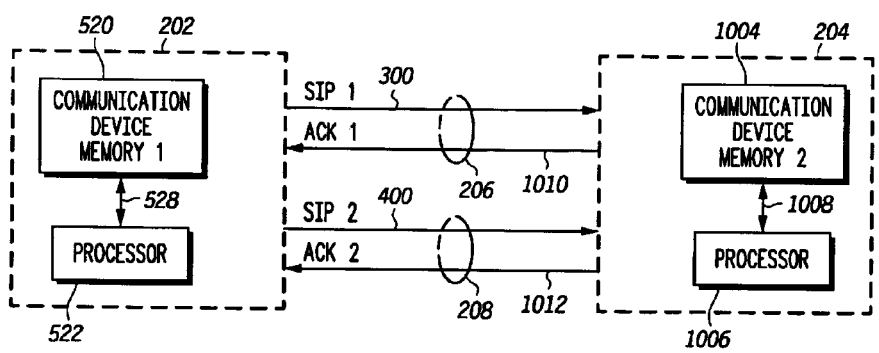
FIG. 10 illustrates a block diagram of the multi-media communication system of FIG. 9.

FIG. 10 provides further illustration of the alternative embodiment disclosed in the system 900. FIG. 10 illustrates the first communication device 202, similar to that described with reference to FIG. 5, having a communication device memory 520, a processor 522 and executable instructions 528 which are provided therebetween. Further included, the second communication device 204 further includes communication device memory 1004, a processor 1006, an executable instructions 1008 disposed therebetween. Similar to the processor 522, the processor 1006 may be, but not limited to, a single processor, a plurality of processors, a DSP, a microprocessor, an ASIC, a state machine or any other implementation capable of processing and executing software. The term processor should not be construed to refer exclusively to hardware capable of executing software, it may implicitly include DSP hardware, ROM for storing hardware, RAM, and any other volatile or nonvolatile storage medium. The communication device memory 1004 may be, but not limited to, a single memory, a plurality of memory locations, shared memory, a CD, DVD, a ROM, RAM, EPROM, optical storage, micro-code, or any other nonvolatile storage capable of storing digital data for use by the processor 1006.

In this embodiment, the first communication device 202, in response to executable instructions 528, provides the first SIP invite request 300 to the second communication device 204, whereupon the second communication device sends a first acknowledgment signal 1010 back to the first communication device 202. The first communication device 202 also sends a second SIP invite request 400 to engage in multi-media communication, to the second memory device 204. Thereupon, in response to executable instructions 1008 from the communication device memory 1004, the processor determines whether or not the second SIP invite request 400 is duplicative. In this embodiment, the executable instructions for making this determination are similar to the executable instructions 528 utilized by the SIP proxy 212 as discussed with reference to FIG. 5. A determination is made based on a comparison of the call transaction values, such as 303 and 403 to determine that certain call transaction identifiers 302, 402, for example, the command sequence field 314 and 414, are not identical. Similar to the SIP proxy 212, if the second communication device 204 determines the second SIP invite request 400 to be duplicative, it thereupon discards the invite request. Whereas, when a determination is made that the second SIP invite request 400 is not a duplicate, a second acknowledgment signal 1012 is sent back to the first communication device 2002.

As such, the first communication device 202 and the second communication device 204, operating in regards to executable instructions 528 and 1008 respectively engage in multi-media communication by communicating a first media across the first network, shown generally at 206, and a second media across the second network, shown generally at 208.

Moreover, as recognized by one having ordinary skill in the art, the first network 206 and the second network 208 may be one in the same network, whereupon the first communication device 202 and the second communication device 204 initiate multiple communication sessions across the same communication path or paths and each individual communication session is defined by the accompanying SIP call transaction identifiers, such as 302 and 402, within the multiple SIP invite requests, such as 300 and 400.

The communication device, such as 202 allows the communication of a multi-media session over a plurality of networks, wherein the communication device, such as 202, may engage separate networks for specific media types. Therein, the communication device, such as 202, may engage specific networks based on network parameters that better facilitate the multi-media session. For example, the communication device, such as 202, might engage a Bluetooth local area network to transmit and receive video information which typically has higher bandwidth requirements. The communication device, such as 202, may also engage a cellular network to transmit voice or text data, wherein the cellular network may not have as much bandwidth availability as the local area network. As such, the communication device can engage in multi-media communication across a plurality of networks through a single SIP proxy, such as 212.

The SIP proxy, such as 212, further improves over the prior art by detecting a different SIP invite request from the same communication device, such as 202. The SIP proxy, such as 212, compares an incoming SIP proxy request with existing SIP proxy requests to determine whether the SIP invite request is duplicative. The SIP proxy allows the communication device, such as 202, to send separate SIP proxy invite requests, such as 300 and 400, across separate networks for engaging in multi-media communication across a plurality of networks. The improved SIP proxy, such as 212, still determines when an SIP invite request is duplicative, but also through the step of comparing the multiple SIP invite requests, determines when the multiple SIP invite requests are for communication between same communication devices, such as 202 and 204, across separate networks.

Figure 11:
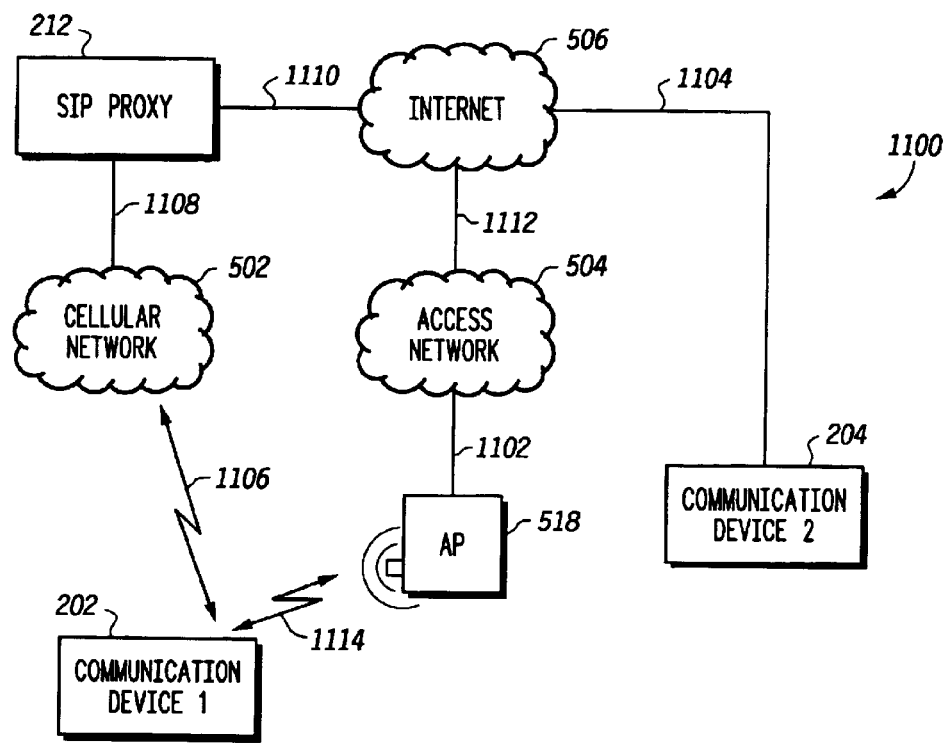
FIG. 11 illustrates a block diagram of a multi-media communication system, in accordance with another embodiment of the present invention.

FIG. 11 illustrates another embodiment of a multi-media communication system 1100 having the first communication device 202, the second communication device 204, the access point 518, the access network 504, the internet 506, the SIP proxy 212 and the cellular network 502. As recognized by one having ordinary skill in the art, elements within the system 1100 have been omitted for clarity purposes only.

In accordance with alternative embodiments, the system 1100 may provide multi-media communication across multiple networks using at least three different techniques. These embodiments provide for the first communication device 202 to contain the ability to communicate utilizing the wireless local area network access point 518, wherein access point 518 comprises a SIP client disposed within, and a media communication capability such as for example a video transmit and receive capability. Moreover, these embodiments provide for the first communication device 202 to engage in communication utilizing the access point 518 based on temporal proximity to the access point. The access network 504 detects the communication device 202 and measures a radio signal strength indicator (RSSI) at the access point 518. When the RSSI meets criteria based upon RSSI threshold values and timing, this indicates that the first communication device 202 is within proximity to effectively engage in communication across the access point 518, wherein the first communication device 202 continues to provide the previously established communication to the second communication device 204 across the cellular network 502 and the SIP proxy 212. When the RSSI threshold value and timing fail to meet the criteria, as discussed in co-pending patent application entitled "METHOD AND APPARATUS FOR SPLITTING CONTROL AND MEDIA CONTENT FROM A CELLULAR NETWORK CONNECTION" having Ser. No. 10/037,956 and a filing date of Dec. 21, 2001, the communication utilizing access point 518 will be disconnected Furthermore, the first communication device 202 may provide a capability signal or a preference signal to the access point 518 such that the access network 504 may effectively coordinate multi-media communication across the access point 518. Alternatively, the capability signal or preference signal may be provided by a database resident within the access network 504. Concurrent with the measurement of the RSSI criteria, the first communication device 202 engages the second communication device 204 across the cellular network 502. In accordance with known communication techniques, the first communication device 202 engages the cellular network 502, providing a communication signal 1106, wherein the cellular network 502 provides the SIP components, and the voice over IP (VoIP) portion, of the communication signal 1106 to the SIP proxy 212 through communication path 1108 as known by one skilled in the art for establishing VoIP calls using a cellular network. As discussed above, the SIP proxy, based on the original SIP invite request, engages the internet 506 across communication path 1110 to the second communication device across communication path 1104. Also within the system of FIG. 11, the communication session across the cellular network 502 provides communication of a first media, such as a voice, based on limited bandwidth availability.

In one embodiment of the system of FIG. 11, when the first communication device 202 is within acceptable proximity of the access point 518, wherein the RSSI meets the criteria as discussed above, the access network 504 may transmit two SIP invite requests concurrent with the maintenance of the cellular communication session across the cellular network. The first SIP invite request is provided across communication path 1102 to a SIP client disposed on the access point 518, wherein the SIP client provides for the initiation of a communication session across the access point 518. The second SIP invite request is provided to the second communication device 204 through the internet 506, across communication paths 1112 and 1104. Moreover, as recognized by one having ordinary skill in the art, the internet 506 is exemplary in nature only and any other suitable network may be utilized.

Based on the two SIP invite requests, a gateway (not shown) within the access network 504 establishes a SIP communication session between access point 518 and second communications device 204. The access network 504 then sends the SIP clients of access point 518, and second communications device 204, a SIP update message such that a direct point-to-point SIP connection for a second media, such as video based on available bandwidth, is established between access point 518 and second communications device 204. In this embodiment, the connection to the access network 504 is maintained until the second media portion of the call is terminated. The first communication device 202 is thereby engaged in a multi-media call to second communications device 204 wherein voice is transmitted and received via the cellular network, and video is transmitted and received via access point 518 via, for example, the internet 506.

In another embodiment of the system 1100 of FIG. 11, the access network gateway (not shown) may provide SIP addressing information of the access point 518 to the first communication device 202 and a command for the mobile station 202 to transmit, across access point 518, a second SIP invite request to the second communications device 204. When the first communication device 202 sends the second SIP invite request to the second communication device 204 across the access network 504 and through the internet 506, the second SIP invite request designates the communication session to have a specific media type, such as video based on bandwidth availability. As such, when the second communication device 204 receives the second SIP invite request, based on the different SIP call transaction identifiers, as discussed above, engages in a second communication session with a SIP client disposed on the access point 518, whereupon the first communication session across the cellular network 502 may be a first media type, such as voice, based on bandwidth availability, and the second communication is the second media type such as video, thereupon providing for a multi-media communication session across separate networks, such as 502 and 504.

In another embodiment of the system 1100 of FIG. 11, the access network 504, more specifically the access network gateway (not shown), provides SIP addressing information to the SIP client (not shown) disposed on the access point 504 and a session initiation command, which is any suitable type of signal that commands the access point 504 to transmit a second SIP invite request to the second communications device 204 directly without a proxy. As such, when the second communication device 204 receives the second SIP invite request, based on the different SIP call transaction identifiers, as discussed above, engages in a second communication session with the access point 518 which is engaged with the first communication device 202 across communication path 1114. Whereupon, the first communication session across the cellular network 502 may be a first media type, such as voice, based on bandwidth availability, and the second communication is the second media type, thereupon providing for a multi-media communication session across separate networks, such as 502 and 504.

Moreover, in all three above described embodiments with respect to the system 1100, if the first communication device 202 moves out of range of the access point 518, such that the RSSI is below a minimum threshold value or other criteria established by the access network 504, the second media portion of the multi-media communication session will be terminated. In one embodiment, the first communication device 202 or the access point 518 will transmit a SIP bye message to the second communication device 204.

Furthermore, should the access point 518, in conjunction with the SIP client (not shown), such as may be readily available wherein the access point 518 is a computing system having a video phone and a video camera attached thereto, may provide the first communication device 202 control of specific interactions with the access point 518. For example, if the access point 518 includes the SIP client (not shown), the first communication device may be readily able to resize the viewing screen of the access point 518 video phone.

It should be understood that there exists implementations of other variations and modifications of the invention and its various aspects, as may be readily apparent to those of ordinary skill in the art, and that the invention is not limited by the specific embodiments described herein. For example, the communication device 202 may engage the second communication device 204 in more than two communication sessions, wherein each communication session provides a different media, across more than two networks. Therefore, the SIP proxy 212 may receive a third SIP invite request and engage the second communication device accordingly. It is therefore contemplated to cover by the present invention, any and all modifications, variations, or equivalents to fall within the spirit and scope of all basic underlying principles disclosed and claimed herein.

What is claimed is:

1. A method for multi-media communication comprising:
   a) transmitting a first session invite request having a plurality of first call transaction identifiers, wherein each of the plurality of first call transaction identifiers has a first call transaction value;
   b) engaging in a first communication session utilizing the first session invite request wherein the first communication session is engaged using a proxy;
   c) concurrent with at least one of: step (a) and (b), transmitting a second session invite request having a plurality of second call transaction identifiers, wherein each of the plurality of second call transaction identifiers has a second call transaction value, such that the plurality of first call transaction identifiers corresponds to the plurality of second call transaction identifiers and at least one of the plurality of first call transaction values is different from the plurality of second call transaction values for corresponding first call transaction identifiers and second call transaction identifiers; and
   d) engaging in a second communication session using the proxy, utilizing the second session invite request,
   wherein a first communication device transmits the first session invite request and the second session invite request,
   wherein the first communication session and the second communication session are conducted between the first communication device and a second communication device.

2. The method of claim 1 wherein the first communication session is through a first communication network and the second communication session is through a second communication network.

3. The method of claim 2 wherein the first communication session is directed to a first media type using the first communication network and the second communication session is directed to a second media type using the second communication network, such that the first communication session and the second communication session create a multi-media communication session.

4. The method of claim 1 wherein the at least one of the plurality of first call transaction values that is different from the plurality of second call transaction values for corresponding first call transaction identifiers and second call transaction identifiers includes at least one of the following: a VIA identifier, a command sequence and a media type field.

5. The method of claim 1 wherein step (c) is concurrent with step (b) and the second invite request is provided to an access point from an access network and a third session invite request having a plurality of third call transaction identifiers is provided to a communication device from the access network.

6. The method of claim 1 wherein step (c) is concurrent with step (b), further comprising:
(d) transmitting a session address and a session initiation command to the first communication device, such that the first communication device transmits the second session invite request to the second communication device based on the session address in response to the session initiation command.

7. The method of claim 1 wherein step (c) is concurrent with step (b), further comprising;
(d) transmitting a session address and a session initiation command to an access point client, such that the access point client transmits the second session invite request to a communication device based on the session address in response to the session initiation command.

8. A method for multi-media communication comprising:
a) receiving a first session invite request having a plurality of first call transaction identifiers from a first communication device, wherein each of the plurality of first call transaction identifiers has a first call transaction value;
b) engaging in a first communication session with the first communication device in response to the first session invite request;
c) concurrent with at least one of: step (a) and (b), receiving a second session invite request having a plurality of second call transaction identifiers from the first communication device, wherein each of the plurality of second call transaction identifiers has a second call transaction value and wherein each one of the plurality of first call transaction identifiers corresponds to the each one of the plurality of second call transaction identifiers;
d) comparing the first call transaction values to the second call transaction values; and
e) engaging in a second communication session with the first communication device when at least one of the plurality of first call transaction values is different from one of the plurality of second call transaction values for the corresponding first call transaction identifiers and the second call transaction identifiers.

9. The method of claim 8, wherein the first session invite request and the second session invite request are provided through a proxy.

10. The method of claim 8 wherein step (a) further comprises:

(a1) transmitting a first acknowledgment signal in response to the first session invite request.

11. The method of claim 8 wherein the step (e) further comprises:
(e1) transmitting a second acknowledgment signal in response to the second session invite request.

12. The method of claim 9 wherein the first communication session is through a first network and the second communication session is through a second network.

13. The method of claim 12 wherein the first communication session communicates information in a first media type and the second communication session communicates information in a second media type such that the first communication session and the second communication session create a multi-media communication session.

14. An apparatus for multi-media communication comprising:
at least one processor; and
at least one memory device, coupled to the at least one processor, having stored executable instructions that, when executed by the at least one processor, cause the at least one processor to:
a) transmit a first session invite request having a plurality of first call transaction identifiers, wherein each of the plurality of first call transaction identifiers has a first call transaction value;
b) engage in a first communication session utilizing the first session invite request wherein the first communication session is engaged using a proxy; and
c) concurrent with at least one of: step (a) and (b), transmit a second session invite request having a plurality of second call transaction identifiers, wherein each of the plurality of second call transaction identifiers has a second call transaction value, such that the plurality of first call transaction identifiers corresponds to the plurality of second call transaction identifiers and at least one of the plurality of first call transaction values is different from the plurality of second call transaction values for corresponding first call transaction identifiers and second call transaction identifiers; and
(d) engaging in a second communication session using the proxy, utilizing the second invite request,
wherein the first communication session and the second communication session are conducted between a first communication device and a second communication device.

15. The apparatus of claim 14 wherein the first communication session is through a first communication network and the second communication session is through a second communication network and the first communication session is directed to a first media type using the first communication network and the second communication session is directed to a second media type using the second communication network, such that the first communication session and the second communication session create a multi-media communication session.

16. An apparatus for multi-media communication comprising:
at least one processor; and
at least one memory device, coupled to the at least one processor, having stored executable instructions that, when executed by the at least one processor, cause the at least one processor to:
a) receive a first session invite request having a plurality of first call transaction identifiers from a first communication device, wherein each of the plurality of first call transaction identifiers has a first call transaction value;

b) engage in a first communication session with the first communication device in response to the first session invite request;

c) concurrent with at least one of: step (a) and (b), receive a second session invite request having a plurality of second call transaction identifiers from the first communication device, wherein each of the plurality of second call transaction identifiers has a second call transaction value and wherein each one of the plurality of first call transaction identifiers corresponds to the each one of the plurality of second call transaction identifiers;

d) compare the first call transaction values to the second call transaction values; and e) engage in a second communication session with the first communication device when at least one of the plurality of first call transaction values is different from one of the plurality of second call transaction values for the corresponding first call transaction identifiers and the second call transaction identifiers.

17. The apparatus of claim 16 wherein the at least one memory having stored executable instructions that, when executed by the at least one processor, cause the at least one processor to:

transmit a first acknowledgment signal in response to the first session invite request and transmit a second acknowledgment signal if the second session invite request is accepted.

18. The apparatus of claim 17 wherein the first communication session communicates information in a first media type and the second communication session communicates information in a second media type such that the first communication session and the second communication session create a multi-media communication session.

19. A method for multi-media communication comprising:

a) wirelessly transmitting a first session invite request having a plurality of first call transaction identifiers, wherein each of the plurality of first call transaction identifiers has a first call transaction value;

b) engaging in a first wireless communication session utilizing the first session invite request, wherein the first communication session is engaged using a proxy;

c) concurrent with at least one of: step (a) and (b), wirelessly transmitting a second session invite request having a plurality of second call transaction identifiers, wherein each of the plurality of second call transaction identifiers has a second call transaction value, such that the plurality of first call transaction identifiers corresponds to the plurality of second call transaction identifiers and at least one of the plurality of first call transaction values is different from the plurality of second call transaction values for corresponding first call transaction identifiers and second call transaction identifiers, and d) engaging in a second wireless communication session using the proxy, utilizing the second session invite request, wherein a first communication device transmits the first session invite request and the second session invite request, wherein the first communication session and the second communication session are conducted between the first communication device and a second communication device.

20. The method of claim 19 wherein the first communication session is through a first communication network and the second communication session is through a second communication network.

21. The method of claim 20 wherein the first communication session is directed to a first media type using the first communication network and the second communication session is directed to a second media type using the second communication network, such that the first communication session and the second communication session create a multi-media communication session.

22. The method of claim 19 wherein the at least one of the plurality of first call transaction values that is different from the plurality of second call transaction values for corresponding first call transaction identifiers and second call transaction identifiers includes at least one of the following: a VIA identifier, a command sequence and a media type field.

23. The method of claim 19 wherein step (c) is concurrent with step (b) and the second invite request is provided to an access point from an access network and a third session invite request having a plurality of third call transaction identifiers is provided to a communication device from the access network.

24. The method of claim 19 wherein step (c) is concurrent with step (b), further comprising:

(d) wirelessly transmitting a session address and a session initiation command to the first communication device, such that the first communication device wirelessly transmits the second session invite request to the second communication device based on the session address in response to the session initiation command.

25. The method of claim 19 wherein step (c) is concurrent with step (b), further comprising:

(d) wirelessly transmitting a session address and a session initiation command to an access point client, such that the access point client transmits the second session invite request to a communication device based on the session address in response to the session initiation command.

* * * * *